Sept. 24, 1974  SHI-YIN WONG  3,838,059

LIQUID CRYSTAL COMPOSITION

Filed Feb. 22, 1972

United States Patent Office 3,838,059
Patented Sept. 24, 1974

3,838,059
LIQUID CRYSTAL COMPOSITION
Shi-Yin Wong, Santa Monica, Calif., assignor to Hughes Aircraft Company, Culver City, Calif.
Filed Feb. 22, 1972, Ser. No. 228,166
Int. Cl. G02f 1/16
U.S. Cl. 252—299                          7 Claims

ABSTRACT OF THE DISCLOSURE

The operational characteristics (fast responding) are improved for the electrical field induced dynamic scattering mode (DSM) in nematics, and for emulsion storage scattering (ESS) in nematic-cholesteric liquid crystals. For example, small amounts of Squarylium dye material or of tetracyano-p-benzoquinone are particularly favorable dopants. The improved longevity and fast rise and decay characteristics also pertain to application of my doped liquid crystal compositions in photoactivated liquid crystal cells as real time projection displays, stored-image projection displays, and real-time light values for non-coherent modulation of coherent light, including application to electro-optical projection, storage, and memory devices.

BACKGROUND OF THE INVENTION OR IMPROVEMENT

1. Field of the Invention

Improved electro-optic responsive of liquid crystal compositions and method of controlled doping of liquid crystal compositions for improved durability and operational characteristics of electrical induced dynamic scattering mode or emulsion storage scattering in nematic liquid crystal compositions under normal room temperature conditions.

2. Description of the Prior Art

Nematic liquid crystal compositions are known. However, under applied electrical forces their performance is not always reproducible and under conditions of operation they have shown increasingly less or reduced DSM or ESS, and the conductivities and responsive characteristics of impure liquid crystals are not always the same.

In a patent issued to RCA (U.S. 3,499,112, G. H. Heilmeier et al.) it was claimed that addition of p-n-butoxybenzoic acid to anisylidene-p-aminophenyacetate increased the contrast ratio and the addition of dodecylisoquinolium bromide enhanced the DSM effect of p-azoxyanisole. However, these liquid crystals operated at high temperatures. Both the DSM and ESS effects were reported by Heilmeier et al. (G. H. Heilmeier et al., Appl. Phys. Letters, 13, No. 1 and 4 (1968); Proc. IEEE 56, 1162 (1968), and G. H. Heilmeier and J. E. Goldmacher, Appl. Phys. Letters 13, 132 (1968); Proc. IEEE 57, 34 (1969).)

The application of J. D. Margerum (Ser. No. 54,274, now abandoned) discloses an improved form of both the ZnS and CdS photoactivated crystal cells. The cells therein are greatly improved using the doped liquid crystals as herein provided and the operational methods disclosed therein are applicable to liquid crystal compositions herein described. In addition, there are numerous publications relating to the description of liquid crystals and method of application or use, to which the doped nematic liquid crystal compositions herein described, and the methods therein, are applicable. For example, "Liquid-Crystal Image Intensifier and Recorder," IBM Technical Disclosure Bulletin, Vol. 12, No. 6, November 1969; "Dynamic Scattering," G. H. Heilmeier et al., Proceedings of the IEEE, Vol. 56, No. 7, July 1968, pages 1162–1171; "Reflective Liquid Crystal Television Display," John A. Van Raalte, Proceedings of the IEEE, Vol. 56, No. 12, December 1968, pages 2146–2149; and "Further Studies of the Dynamic Scattering Mode in Nematic Liquid Crystals," G. H. Heilmeier et al., IEEE Transactions on Electron Devices, Vol. Ed-17, No. 1, January 1970, pages 22–26; and "Now That the Heat Is Off, Liquid Crystals Can Show Their Colors Everywhere," Electronics, July 6, 1970, pages 64–70. These articles illustrate the applicable usage of applicant's doped liquid crystal compositions and when substituted therein provide the improved electro-optical performance effects hereinafter described.

BRIEF SUMMARY OF THE INVENTION

The compositions of DSM liquid crystals used for impurity doping are summarized in Table I. Table II summarized the compounds used as doped impurities. Of these impurities, Squarylium dye III (1) and tetracyano-p-benzoquinone(2) gave the best performance. For example, the decay time of scattering for p-methoxybenzylidene-p'-n-butylaniline (50 v., ½ mil) was 0.5 sec., and the same sample with less than 0.1% of Squarylium dye III, the decay time was only 0.07 sec.

ESS and photoactivated ESS liquid crystal compositions can be prepared by dissolving about 10% by weight of a cholesteric liquid crystal in the nematic liquid crystals tabulated in Table I. For example, in a photoactivated CdS-liquid crystal cell, an 8% by weight of cholesteryl nonanoate in undoped MBBA gave undefined or no photoactivated image. However, when 0.1% by weight of Squarylium dye III was added to this composition, an excellent photoactivated image was produced.

BRIEF SUMMARY OF PREPARATION OF LIQUID CRYSTAL COMPOSITIONS

Individual components of the liquid crystals were weighed out and combined together. The heterogeneous mixture was heated to about 100° C. to melt the mixture to a homogeneous phase. The mixture was then cooled to room temperature to give a stable room temperature nematic liquid crystal mixture.

BRIEF SUMMARY OF PREPARATION OF LIQUID CRYSTAL WITH DOPANT

In order to dope the liquid crystal with conductive impurities, e.g., with Squarylium dye III, the dopant was first ground with a mortar and pestle before it was dissolved into the liquid crystal. For example, a 0.1% Squarylium dye III in MBBA, herein the 0.1% (by wt.) of ground Squarylium compound was mixed with the MBBA and the mixture was heated to 100° C. for 15 minutes to dissolve the dopant. The MBBA solution was left at room temperature overnight and was filtered through millipore. After the filtration, the liquid crystal mixture was ready for the application described herein.

BRIEF SUMMARY OF THE INVENTION

Figure 1:
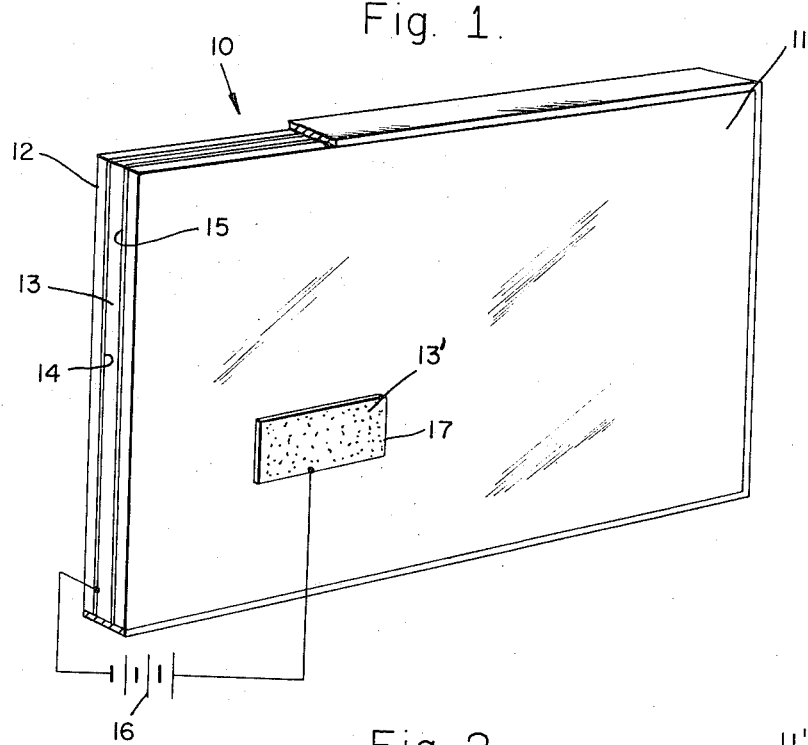
FIG. 1 is a schematic view of a doped DSM liquid crystal cell illustrating its operation characteristic.

There is provided, as shown in FIG. 1, a cell 10 comprised of a pair of spaced transparent plastic or glass plates 11 and 12 sealed about the edges (not shown) and containing therebetween a thin film of doped liquid crystal nematic composition 13, as hereinafter illustrated. The transparent plates 11 and 12 are provided on their inner sides with transparent conductor coatings 14 and 15, one or the other or both of which are connected to a D-C electrical source 16.

To illustrate the operational characteristics of the DSM liquid crystal composition 13, for example, p-methoxy-benzylidene-p-n-butylaniline, containing less than 0.1% of Squarylium dye III provides a nematic composition transparent under normal light at room temperature. However, when an area of the transparent liquid cell composition is activated by a D-C voltage, as battery source 16, with a current of 1–10 microamps per sq. cm. in area 13', by energizing transparent conductor 17, e.g., the confined area of the transparent electrode 17, in conjunction with the opposite transparent electrode 14, the area 13' immediately switches to relatively strong light scattering state while the balance of the liquid crystal composition remains transparent. The dynamic scattering mode (DSM) change is visually observable, e.g., by a charge of 20 volts and a current density of 1–5 microamps per sq. cm. of display area, in normal light. By projection of a light therethrough (not shown) with desired electrical design configuration (not shown) an image, or series of images, can be made with improved rapidity. The fade-out or decay time (50 v., ½ mil) was 0.5 second for normal liquid crystal and the same sample doped with less than 0.1% by weight of Squarylium dye or tetracyano-p-benzoquinone was only 0.07 second.

Figure 2:
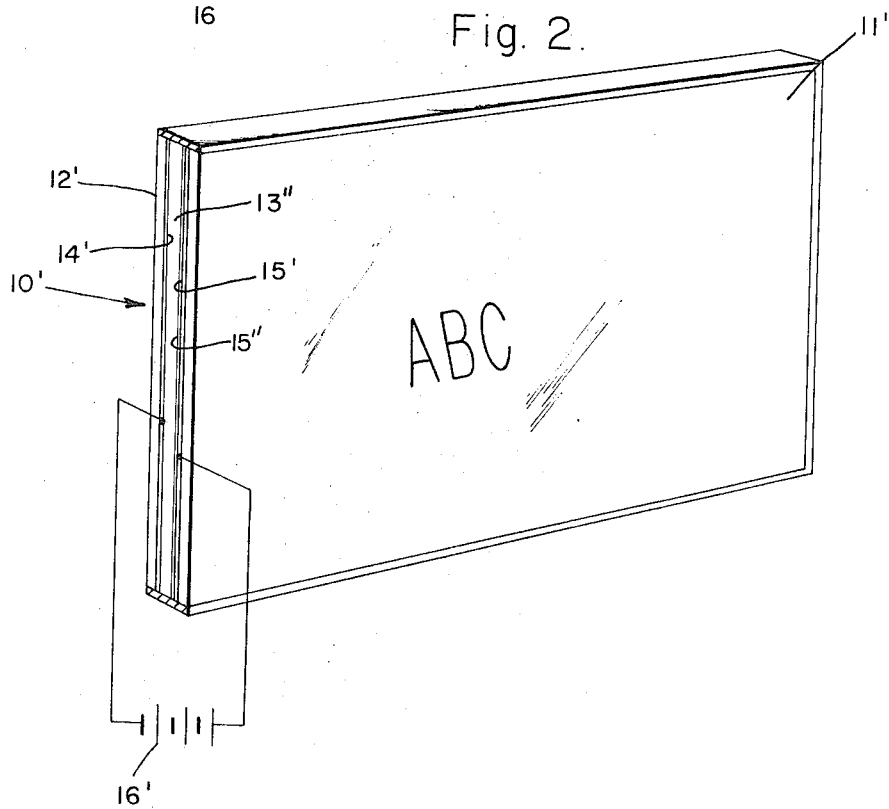
FIG. 2 is a partial schematic of a modified doped ESS liquid crystal display cell illustrating its operational characteristic.

As illustrated in FIG. 2, there is shown a cell 10' of nematic liquid crystal material, as above indicated, prepared by dissolving therein about 8–10% by weight of cholesteric liquid crystal (cholesteryl nonanoate) and mixing therewith about 0.1% by weight Squarylium dye III. A thin film 13" of the above mixture was mounted between transparent plates 11' and 12'. The transparent plate 11' is provided on the inner surface with a transparent conductor, as tin oxide, coating 15' (e.g., Nesa coated glass) over which is a coating of transparent ultraviolet or visible photoconductor material as ZnS or CdS 15" applied as described in the above indicated Margerum application. The transparent plate 12' is also provided with a similar or like transparent conductor coating 14'. An image or recording is formed in the liquid crystal composition by initially exposing the cell to a recording image, or data, for photoactivation of the photoactive layer or layers with a D-C charge on coatings 14' and 15' of 50–80 volts and a current of 1–10 microamps. With the imaging light activating the photoconductor, an emulsion image, as data A, B, C is produced in the liquid crystal composition. When the D-C voltage is disconnected, the transparent liquid crystal composition retains the image.

As indicated, modification or change of the ESS effect can be by activation of a selective area of electrical design (special design wiring not shown) with low frequency A-C and erased with high frequency A-C. Stored image compositions, for optical processing, containing a mixture of MBBA, dopant, as described, and cholesteryl nonanoate provided liquid crystals of long shelf life and a mesomorphic range of 10° to 42° C. These compositions give long term ESS images when D-C electric fields are applied in optical imaging activation, showing ABC for example, and they are erased by imposing high voltage (10 kHz.) A-C signals. The ZnS photoconductors are best activated with UV light, while the CdS are best activated by blue or green light. These doped compositions, as described, are sensitive to record CRT images with as little as 15 $\mu\omega/cm.^2$ to produce images which can be used in large screen projection displays. The compositions are sensitive for recording DSM images in doped nematics requiring only about 2 $\mu\omega/cm.^2$ for CdS cells. The DSM images are obtained from a 15 ms. exposure.

The following is illustrative of liquid crystal nematics and compositions applicable to room temperature operation:

TABLE I

Room Temperature Nematics

| Compounds | | Composition by weight |
|---|---|---|
| Composition A | 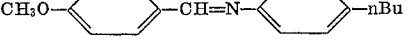 p-Methoxybenzylidene-p-n-butylaniline (MBBA) | |
| Composition B: (i) (ii) | MBBA 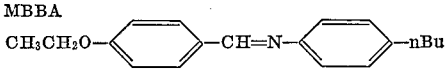 p-Ethoxybenzylidene-p-n-butylaniline (EBBA) | 1 part. 2 parts. |
| Composition C: (i) (ii) (iii) | MBBA EBBA 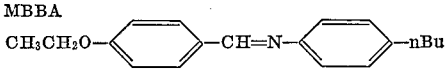 Bis-(4-n-Octyloxybenzylidene)-2-chloro-1,4-phenylenediamine (BOCPD) | 1 part. 2 parts. 0.2 part. |
| Composition D: (i) | 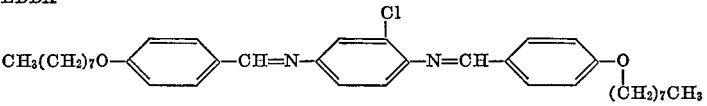 p-Methylbenzylidene-p-n-butylaniline | 1 part. |
| (ii) | 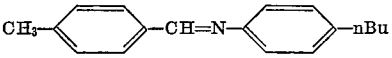 p-Octyloxybenzylidene-p-n-butylaniline | 1 part. |
| (iii) (iv) | BOCPD EBBA | 0.2 part. 0.15 part. |
| (v) | 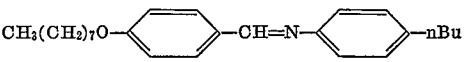 p-Hexyloxybenzylidene-p-n-butyl | 0.1 part. |
| (vi) | 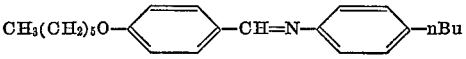 p-Butoxybenzylidene-p-n-butylaniline | 0.1 part. |

The ionizable or chargeable organic doping materials for modifying the room temperature nematics are illustrated as follows:

TABLE II
Impurity doping

| | Formula | Chemical name |
|---|---|---|
| 1 | $(CH_3)_2N-C_6H_4-[\text{squarylium core, }O^-, O^-]-C_6H_4-N(CH_3)_2$ | Squarylium dye III. |
| 2 | TCNQ: $(NC)_2C=C_6H_4=C(CN)_2$ | Tetracyano-p-benzoquinone. |
| 3 | 2,7-dinitro-4-nitro-9-(dicyanomethylene)fluorene | (2,4,7-trinitro-9-fluorenylidene) malonitrile. |
| 4 | 2,2,6,6-tetramethyl-4-piperidone 1-oxyl structure | 2,2,6,6-tetramethyl-4-piperidone 1-oxyl. |
| 5 | 2,2,5,5-tetramethylpyrrolidine-3-carboxamide-1-oxyl structure | 2,2,5,5-tetramethylpyrrolidine-3-carboxamide-1-oxyl. |
| 6 | Galvinoxyl structure with $C(CH_3)_3$ groups | Galvinoxyl. |
| 7 | $(C_6H_5)_2N-N-C_6H_2(NO_2)_3$ | 1,1-diphenyl-2-picryl hydrazyl. |
| 8 | $CH_3(CH_2)_3-C_6H_4-OH$ | Butyl-phenol. |
| 9 | $CH_3(CH_2)_5O-C_6H_4-COOH$ | p-Hexyloxy benzoic acid. |
| 10 | $CH_3-C_6H_4-CH=NNH-C_6H_3(NO_2)_2$ | Tolualdehyde-2,4-dinitrophenyl hydrazone. |
| 11 | $C_6H_5-COOH$ | Benzoic acid. |
| 12 | $NO_2-C_6H_4-COOH$ | p-Nitrobenzoic acid. |
| 13 | $C_6H_4(OH)-COOH$ | Salicylic acid. |
| 14 | $N\equiv C-C_6H_4-OH$ | p-Cyanophenol. |
| 15 | $O_2H-C_6H_4-CH_2COOH$ | p-Nitrophenylacetic acid. |

TABLE II.—Continued

| Formula | Chemical name |
|---|---|
| 16. $NO_2-\langle\bigcirc\rangle-CH=N-\langle\bigcirc\rangle-nBn$ , OH on ring | 4-nitro-2-hydroxybenzylidene-p n butylaniline. |
| 17. $NH_2-\langle\bigcirc\rangle-NO_2$ | p-Nitroaniline. |
| 18. Or mixtures thereof. | |

In the above Table II the dopants 1, 2 and 3 are preferred.

Having described the present embodiment of my discovery and improvement in the art, in accordance with the constitutional grant and the patent statute, it will be apparent that some modification and variations may be made within the scope of this disclosure without departing from the spirit and embodiment thereof. The specific embodiments above described are given by way of examples illustrative of my invention, discovery and improvement.

What is claimed is:

1. A liquid crystal composition comprising a nematic liquid crystal and an organic dopant selected from the group consisting of Squarylium dye III, tetracyano-p-benzoquinone, (2,4,7 - trinitro-9-fluorenylidene)-malonitrile, 2,2,6,6 - tetramethyl - 4 - piperidone-1-oxyl, 2,2,5,5-tetramethylpyrrolidine-3-carboxamide-1-oxyl, galvinoxyl, 1,1-diphenyl-2-picryl hydrazyl, butyl-phenol, tolualdehyde-2,4-dinitro-phenyl hydrazone, salicylic acid, p-cyanophenol, p-nitrophenylacetic acid, 4-nitro-2-hydroxybenzylidene-p-n-butylaniline, p-nitroaniline and mixtures thereof.

2. The composition of Claim 1 wherein the liquid crystal is comprised essentially of p-methoxybenzylidene-p-n-butylaniline.

3. The composition of Claim 1 wherein the said dopant is a Squarylium dye III.

4. The composition of Claim 1 wherein the said dopant is tetracyano-p-benzoquinone.

5. A composition of Claim 1 wherein the nematic liquid crystal is a room temperature nematic liquid crystal selected from the group consisting of p-methoxybenzylidene - p - n-butylaniline, p-ethoxybenzylidene-p-n-butylaniline, bis-(4-n-octyloxybenzylidene)-2 - chloro-1,4-phenylenediamine, p - methylbenzylidene - p - n-butylaniline, p-octyloxybenzylidene-p-n-butylaniline, p-hexyloxybenzylidene-p-n-butyl, p - butoxybenzylidene-p-n-butylaniline, and mixtures thereof.

6. A composition of Claim 1 containing an emulsion storage scattering amount of a chloesteric liquid crystal.

7. A composition of Claim 6 wherein the chloesteric liquid crystal is chloesteryl nonanoate.

References Cited

UNITED STATES PATENTS

| | | | |
|---|---|---|---|
| 3,656,834 | 4/1972 | Haller et al. | 350—150 |
| 3,756,694 | 9/1973 | Soree et al. | 23—230 LC |
| 3,720,623 | 3/1973 | Cartmell et al. | 23—230 LC |
| 3,597,044 | 8/1971 | Castellano | 260—465 D |

FOREIGN PATENTS

| | | | |
|---|---|---|---|
| 1,167,486 | 10/1969 | Great Britain | 350—160 LC |
| 1,148,724 | 4/1969 | Great Britain. | |
| 2,017,223 | 5/1970 | France. | |

OTHER REFERENCES

Usol'tseva et al.: *Chemical Characteristics, Structure and Properties of Liquid Crystal*, Russian Chem. Rev., vol. 32, No. 9, pp. 495–507 (September 1963).

"Zeitschrift für Naturforschung," July 1971, pp. 1230–32, Haustein et al.

GEORGE F. LESMES, Primary Examiner

W. R. DIXON, JR., Assistant Examiner

U.S. Cl. X.R.

350—160 LC; 23—230 LC